(12) United States Patent
Pape et al.

(10) Patent No.: US 11,630,771 B2
(45) Date of Patent: Apr. 18, 2023

(54) POISON MECHANISMS FOR DEFERRED INVALIDATES

(71) Applicant: APPLE INC., Cupertino, CA (US)

(72) Inventors: John D Pape, Cedar Park, TX (US); Mahesh K Reddy, Austin, TX (US); Prasanna Utchani Varadharajan, San Jose, CA (US); Pruthivi Vuyyuru, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/373,814

(22) Filed: Jul. 13, 2021

(65) Prior Publication Data

US 2023/0017473 A1 Jan. 19, 2023

(51) Int. Cl.
*G06F 12/0802* (2016.01)

(52) U.S. Cl.
CPC .... *G06F 12/0802* (2013.01); *G06F 2212/683* (2013.01)

(58) Field of Classification Search
CPC ............. G06F 12/0802; G06F 12/0815; G06F 2212/683
See application file for complete search history.

(56) References Cited

U.S. PATENT DOCUMENTS

| | | | |
|---|---|---|---|
| 6,493,809 B1* | 12/2002 | Safranek | G06F 13/4243 711/148 |
| 6,697,076 B1* | 2/2004 | Trivedi | G06F 12/1009 345/568 |
| 6,832,282 B2 | 12/2004 | Duncan et al. | |
| 10,747,535 B1* | 8/2020 | Reddy | G06F 12/084 |
| 2002/0178334 A1* | 11/2002 | Palanca | G06F 12/0859 711/143 |
| 2005/0108481 A1* | 5/2005 | Iyengar | G06F 12/0817 711/E12.027 |
| 2007/0250666 A1* | 10/2007 | Sartorius | G06F 12/0891 711/3 |
| 2008/0109606 A1* | 5/2008 | Lataille | G06F 12/12 711/E12.051 |
| 2010/0191925 A1* | 7/2010 | Blount | H04L 67/568 711/E12.072 |
| 2015/0120978 A1* | 4/2015 | Kalyanasundharam | G06F 12/1009 710/267 |
| 2019/0079874 A1* | 3/2019 | Garcia | G06F 12/0895 |
| 2020/0097292 A1* | 3/2020 | Carlson | G06F 9/30145 |
| 2020/0117602 A1* | 4/2020 | Chirca | G06F 9/30101 |
| 2020/0242243 A1 | 7/2020 | Dou et al. | |

(Continued)

*Primary Examiner* — Michael Krofcheck
(74) *Attorney, Agent, or Firm* — Kligler & Associates Patent Attorneys Ltd (57) ABSTRACT

An apparatus includes multiple processors including respective cache memories, the cache memories configured to cache cache-entries for use by the processors. At least a processor among the processors includes cache management logic that is configured to (i) receive, from one or more of the other processors, cache-invalidation commands that request invalidation of specified cache-entries in the cache memory of the processor (ii) mark the specified cache-entries as intended for invalidation but defer actual invalidation of the specified cache-entries, and (iii) upon detecting a synchronization event associated with the cache-invalidation commands, invalidate the cache-entries that were marked as intended for invalidation.

20 Claims, 5 Drawing Sheets

(56) References Cited

U.S. PATENT DOCUMENTS

2020/0371934 A1\* 11/2020 Chachad ............. G06F 12/0895
2021/0173657 A1\* 6/2021 Mukherjee ............ G06F 9/3836

\* cited by examiner

POISON MECHANISMS FOR DEFERRED INVALIDATES

FIELD OF THE DISCLOSURE

The present disclosure relates generally to processor architecture, and particularly to methods and apparatus for cache invalidation in processors.

BACKGROUND OF THE DISCLOSURE

Modern processors typically use various types of cache memories for reducing the rate of access to external memory. Example types of cache memory include Data Cache (DCache) for caching data, Instruction Cache (ICache) for caching program instructions and Translation Lookaside Buffers (TLB) for caching logical-to-physical address translations. The processor Instruction Set Architecture (ISA) typically includes instructions for invalidating specified cache entries. Such instructions are commonly referred to as "cache invalidates."

SUMMARY OF THE DISCLOSURE

An embodiment that is described herein provides an apparatus including multiple processors. The processors include respective cache memories configured to cache cache-entries for use by the processors. At least a processor among the processors includes cache management logic that is configured to (i) receive, from one or more of the other processors, cache-invalidation commands that request invalidation of specified cache-entries in the cache memory of the processor (ii) mark the specified cache-entries as intended for invalidation but defer actual invalidation of the specified cache-entries, and (iii) upon detecting a synchronization event associated with the cache-invalidation commands, invalidate the cache-entries that were marked as intended for invalidation.

In some embodiments, the cache memory includes a Translation Lookaside Buffer (TLB) configured to cache logical-to-physical address translation entries for the one or more processors. In an example embodiment, the synchronization event includes a Data Synchronization Barrier (DSB) command.

In some embodiments, the cache memory includes an Instruction Cache (ICache) configured to cache program instructions for the one or more processors. In an embodiment, the synchronization event includes an Instruction Synchronization Barrier (ISB) command. In an alternative embodiment, the synchronization event includes a successful fetch of an instruction from outside the ICache.

In another embodiment, the cache management logic is configured to identify a read request, which matches a given cache-entry that is marked as intended for invalidation but has not been actually invalidated, and return the given cache-entry in response to the read request.

In a disclosed embodiment, to mark the specified cache-entries, the cache management logic is configured to set respective indications associated with the specified cache-entries. In an alternative embodiment, to mark the specified cache-entries, the cache management logic is configured to move the specified cache-entries to a region of the cache memory dedicated for cache-entries intended for invalidation.

In some embodiments, by deferring the actual invalidation until the synchronization event, the cache management logic is configured to prevent stalling of any of the one or more processors due to a stream of the cache-invalidation commands.

In an embodiment, at least some of the cache-invalidation commands have respective specified scopes, and the cache management logic is configured to defer the actual invalidation in response to a cache-invalidation command only upon verifying that the scope of the cache-invalidation command matches a scope derived from a current execution state of the processor. In another embodiment, at least some of the cache-entries and at least some of the cache-invalidation commands have respective specified scopes, and the cache management logic is configured to defer the actual invalidation of a cache-entry in response to a cache-invalidation command irrespective of whether the scope of the cache entry matches the scope of the cache-invalidation command.

In an embodiment, the synchronization event includes a context switch.

There is additionally provided, in accordance with an embodiment that is described herein, a method including caching cache-entries in respective cache memories, for use by multiple processors. In at least a processor among the processors, (i) cache-invalidation commands, which request invalidation of specified cache-entries in the cache memory of the processor, are received from one or more of the other processors, (ii) the specified cache-entries are marked as intended for invalidation, but actual invalidation of the specified cache-entries is deferred, and (iii) upon detecting a synchronization event associated with the cache-invalidation commands, the cache-entries that were marked as intended for invalidation are invalidated.

The present disclosure will be more fully understood from the following detailed description of the embodiments thereof, taken together with the drawings in which:

DETAILED DESCRIPTION OF EMBODIMENTS

Overview

Embodiments that are described herein provide improved methods and apparatus for cache management in processors and computing systems. As will be described in detail below, the disclosed techniques protect processors in a multi-processor system against performance degradation that may be caused by streams of cache-invalidation commands. The disclosed techniques are applicable to various types of caches, such as Translation Lookaside Buffers (TLB), Instruction Caches (ICache) and Data Caches (DCache). Caches may be shared, and may have multiple levels, as in an L2 ICache or L2 TLB, for example. The disclosed techniques can be applied at any desired level or levels of a cache.

Consider, for example, a system that includes multiple processors. The processors include respective cache memories that store cache-entries for use by the processors. An undesirable "starvation" scenario may occur when one processor issues a stream of cache-invalidation commands, which request invalidation of specified cache-entries. Another processor in the system, which receives and processes this stream of cache-invalidation commands, may be prevented from accessing the cache or from completing certain instructions. In some cases the latter processor may be stalled altogether. The stream of cache-invalidation commands may be generated intentionally, e.g., by an application deliberately designed to exhibit this behavior, or unintentionally, e.g., as an artifact of poorly designed code.

In some embodiments, at least one of the processors in the system includes cache management logic that, among other tasks, is configured to protect the processor from starvation scenarios. In some embodiments, upon receiving a cache-invalidation command that specifies one or more cache-entries to be invalidated, the cache management logic does not immediately invalidate the specified cache-entries. Instead, the cache management logic marks the specified cache-entries as "poisoned," i.e., as intended for invalidation.

The cache management logic defers actual invalidation of the marked ("poisoned") cache-entries, until detecting a synchronization event (as will be defined below) that is associated with the cache-invalidation command. That is, rather than taking effect immediately upon execution of the cache-invalidation command, invalidation is temporally decoupled from the cache-invalidation command and instead associated with a subsequent synchronization event, effectively distributing the behavior of the cache-invalidation command across multiple events or instructions. Upon receiving a synchronization event, the cache management logic proceeds to invalidate the cache-entries that were marked as intended for invalidation. During the deferral period, i.e., before receiving the synchronization event, the cache management logic regards poisoned cache-entries as valid.

The type of synchronization event, which the cache management logic uses as a trigger for actual invalidation of poisoned cache-entries, depends on the type of cache and the type of cache-invalidation command. For example, when using the disclosed technique to protect a Translation Lookaside Buffer (TLB) from a stream of TLB Invalidates (TLBIs), the cache management logic may defer actual invalidation of TLB entries until detecting that the processor that issued the TLBIs is executing a Data Synchronization Barrier (DSB) command.

When protecting an Instruction Cache (ICache) from a stream of ICache Invalidates, the cache management logic may defer actual invalidation of ICache entries (i) until executing the next Instruction Synchronization Barrier (ISB) command or (ii) until successfully fetching an instruction from outside the ICache (e.g., from external memory upon a cache miss). In all these cases, deferral of invalidation until the next synchronization event is carried out in such a way to meet architectural ordering requirements. At the same time, such a deferral prevents starvation and ensures forward progress of the processor. Processor architectures may differ from one another in the strictness of ordering requirements affecting fetch behavior, and therefore the choice of synchronization events may differ depending on the processor architecture.

It is noted that the embodiments of cache-invalidation commands and synchronization events discussed herein (e.g., TLBIs, ICache Invalidates, DSBs, ISBs, etc.) may correspond to programmer-visible instructions defined in the ISA implemented by a processor. In other embodiments, however, these commands and events may not necessarily be defined in the ISA (e.g., they may correspond to internal behavior not directly visible to the programmer).

System Description

Figure 1:
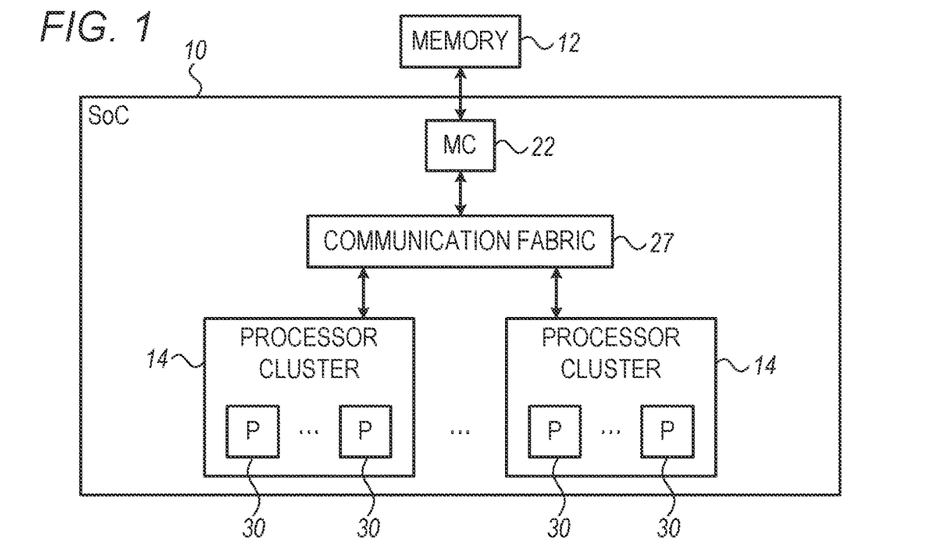
FIG. 1 is a block diagram that schematically illustrates a computing system implemented as a System-on-Chip chip (SOC), in accordance with an embodiment that is described herein.

FIG. 1 is a block diagram that schematically illustrates a computing system implemented as a System-on-Chip (SOC) 10, in accordance with an embodiment that is described herein. SOC 10 is shown coupled to a memory 12. As implied by the name, the components of SOC 10 may be integrated onto a single semiconductor substrate as an integrated circuit "chip." In some embodiments, the components may be implemented on two or more discrete chips in a system. However, SOC 10 will be used as an example herein. In the illustrated embodiment, the components of SOC 10 include a plurality of processor clusters 14, a Memory Controller (MC) 22, a communication fabric 27, and optionally one or more peripheral components (more briefly, "peripherals"—not shown in the figure). Processor clusters 14 and MC 22 may all be coupled to communication fabric 27.

Memory controller 22 may be coupled to memory 12 during use. In some embodiments, there may be more than one memory controller coupled to corresponding memory. The memory address space may be mapped across the memory controllers in any desired fashion. In the illustrated embodiment, processor clusters 14 may include respective pluralities of processors (P) 30. Processors 30 may form the central processing units (CPU(s)) of SOC 10. In an embodiment, one or more processor clusters 14 may not be used as CPUs.

As mentioned above, processor clusters 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture (ISA) implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

Memory controller 22 may generally include the circuitry for receiving memory operations from the other components of SOC 10 and for accessing memory 12 to complete the memory operations. Memory controller 22 may be configured to access any type of memory 12. For example, memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Memory controller 22 may include queues for memory operations, for ordering (and potentially reordering) the operations and presenting the operations to memory 12. Memory controller 22 may further include data buffers to store write data awaiting write to memory and read data awaiting return to the source of the memory operation. In some embodiments, memory controller 22 may include a memory cache to store recently accessed memory data. In SOC implementations, for example, the memory cache may reduce power consumption in the SOC by avoiding re-access of data from memory 12 if the data is expected to be accessed again soon. In some cases, the memory cache may also be referred to as a system cache, as opposed to private caches such as an L2 cache or caches in the processors, which serve only certain components. Additionally, in some embodiments, a system cache need not be located within memory controller 22.

Peripherals in SOC 10 may be any set of additional hardware functionality included in the SOC. For example, the peripherals may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

Communication fabric 27 may be any communication interconnect and protocol for communicating among the components of SOC 10. Communication fabric 27 may be bus-based, including shared bus configurations, cross bar configurations, and hierarchical buses with bridges. Communication fabric 27 may also be packet-based, and may be hierarchical with bridges, cross bar, point-to-point, or other interconnects.

It is noted that the number of components of SOC 10 (and the number of subcomponents for those shown in FIG. 1), such as processors 30 in each processor cluster 14, may vary from embodiment to embodiment. Additionally, the number of processors 30 in one processor cluster 14 may differ from the number of processors 30 in another processor cluster 14. There may be more or fewer of each component/subcomponent than the number shown in FIG. 1.

Figure 2:
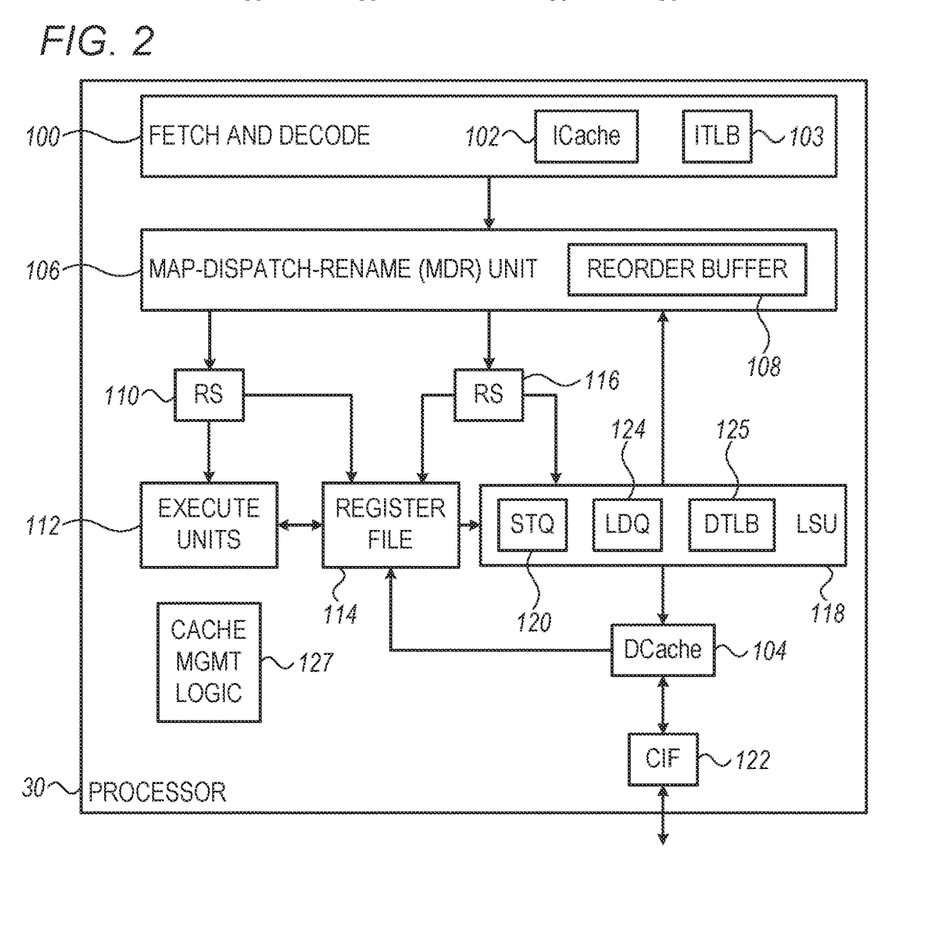
FIG. 2 is a block diagram that schematically illustrates a processor in the SoC of FIG. 1, in accordance with an embodiment that is described herein.

FIG. 2 is a block diagram that schematically illustrates an example processor 30 in SOC 10 of FIG. 1 in greater detail, in accordance with an embodiment that is described herein. In the illustrated embodiment, processor 30 includes a fetch and decode unit 100. Fetch and decode unit 100 includes an instruction cache (ICache) 102 and an Instruction Translation Lookaside Buffer (ITLB) 103.

Processor 30 further includes a map-dispatch-rename (MDR) unit 106 (which in turn includes a reorder buffer 108), one or more reservation stations (RS) 110, one or more execute units 112, a register file 114, a data cache (DCache) 104, a load/store unit (LSU) 118, a reservation station (RS) 116 for the load/store unit, and a core interface unit (CIF) 122. Fetch and decode unit 100 is coupled to MDR unit 106, which is coupled to reservation stations 110, reservation station 116, and LSU 118. Reservation stations 110 are coupled to execution units 112. Register file 114 is coupled to execute units 112 and LSU 118. LSU 118 is also coupled to DCache 104, which is coupled to CIF 122 and register file 114. LSU 118 includes a store queue (STQ) 120, a load queue (LDQ) 124, and a Data TLB (DTLB) 125.

Fetch and decode unit 100 may be configured to fetch instructions for execution by processor 30 and decode the instructions into ops for execution. More particularly, fetch and decode unit 100 may be configured to cache instructions previously fetched from memory (through CIF 122) in ICache 102, and may be configured to fetch a speculative path of instructions for processor 30. Fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. Fetch and decode unit 100 may be configured to decode the instructions into instruction operations.

In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the ISA implemented by processor 30 may be decoded into a single instruction operation, and thus the instruction operation may be essentially synonymous with the instruction (although it may be modified in form by the decoder). The term "instruction operation" may be more briefly referred to herein as "op."

MDR unit 106 may be configured to map the ops to speculative resources (e.g., physical registers) to permit out-of-order and/or speculative execution, and may dispatch the ops to reservation stations 110 and 116. The ops may be mapped to physical registers in register file 114 from the architectural registers used in the corresponding instructions. That is, register file 114 may implement a set of physical registers that may be greater in number than the architected registers specified by the instruction set architecture implemented by processor 30. MDR unit 106 may manage the mapping of the architected registers to physical registers. There may be separate physical registers for different operand types (e.g., integer, media, floating point, etc.) in an embodiment. In other embodiments, the physical registers may be shared over operand types. MDR unit 106 may also be responsible for tracking the speculative execution and retiring ops or flushing misspeculated ops. Reorder buffer 108 may be used to track the program order of ops and manage retirement/flush. That is, reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of execution units 112 and the LSU 118, e.g., in reservation stations 116 and 110. Other embodiments may implement a centralized scheduler if desired.

LSU 118 may be configured to execute load/store memory ops. Generally, a memory operation (memory op) may be an instruction operation that specifies an access to memory (although the memory access may be completed in a cache such as DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores.

In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data.

In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The address generated via execution of the store address op may be referred to as an address corresponding to the store op.

Load/store ops may be received in reservation station 116, which may be configured to monitor the source operands of the operations to determine when they are available and then issue the operations to the load or store pipelines, respectively. Some source operands may be available when the operations are received in reservation station 116, which may be indicated in the data received by reservation station 116 from MDR unit 106 for the corresponding operation. Other operands may become available via execution of operations by other execution units 112 or even via execution of earlier load ops. The operands may be gathered by reservation station 116, or may be read from register file 114 upon issue from reservation station 116 as shown in FIG. 2.

In an embodiment, reservation station 116 may be configured to issue load/store ops out of order (from their original order in the code sequence being executed by processor 30, referred to as "program order") as the operands become available. To ensure that there is space in LDQ 124 or STQ 120 for older operations that are bypassed by younger operations in reservation station 116, MDR unit 106 may include circuitry that pre-allocates LDQ 124 or STQ 120 entries to operations transmitted to load/store unit 118. If there is not an available LDQ entry for a load being processed in MDR unit 106, MDR unit 106 may stall dispatch of the load op and subsequent ops in program order until one or more LDQ entries become available. Similarly, if there is not a STQ entry available for a store, MDR unit 106 may stall op dispatch until one or more STQ entries become available. In other embodiments, reservation station 116 may issue operations in program order and LRQ 46/STQ 120 assignment may occur at issue from reservation station 116.

LDQ 124 may track loads from initial execution to retirement by LSU 118. LDQ 124 may be responsible for ensuring the memory ordering rules are not violated (between out of order executed loads, as well as between loads and stores). If a memory ordering violation is detected, LDQ 124 may signal a redirect for the corresponding load. A redirect may cause processor 30 to flush the load and subsequent ops in program order, and refetch the corresponding instructions. Speculative state for the load and subsequent ops may be discarded and the ops may be refetched by fetch and decode unit 100 and reprocessed to be executed again.

When a load/store address op is issued by reservation station 116, LSU 118 may be configured to generate the address accessed by the load/store, and may be configured to translate the address from an effective or virtual address created from the address operands of the load/store address op to a physical address actually used to address memory. LSU 118 may be configured to generate an access to DCache 104. For load operations that hit in DCache 104, data may be speculatively forwarded from DCache 104 to the destination operand of the load operation (e.g., a register in register file 114), unless the address hits a preceding operation in STQ 120 (that is, an older store in program order) or the load is replayed.

The data may also be forwarded to dependent ops that were speculatively scheduled and are in the execution units 112. The execution units 112 may bypass the forwarded data in place of the data output from register file 114, in such cases. If the store data is available for forwarding on a STQ hit, data output by STQ 120 may forwarded instead of cache data. Cache misses and STQ hits where the data cannot be forwarded may be reasons for replay and the load data may not be forwarded in those cases. The cache hit/miss status from DCache 104 may be logged in STQ 120 or LDQ 124 for later processing.

LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, RS 116 may issue any number of loads up to the number of load pipes in the same clock cycle. LSU 118 may also implement one or more store pipes, and in particular may implement multiple store pipes. The number of store pipes need not equal the number of load pipes, however. In an embodiment, for example, two store pipes may be used. Reservation station 116 may issue store address ops and store data ops independently and in parallel to the store pipes. The store pipes may be coupled to STQ 120, which may be configured to hold store operations that have been executed but have not committed.

CIF 122 may be responsible for communicating with the rest of a system including processor 30, on behalf of processor 30. For example, CIF 122 may be configured to request data for DCache 104 misses and ICache 102 misses. When the data is returned, CIF 122 may signal the cache fill to the corresponding cache. For DCache fills, CIF 122 may also inform LSU 118. LDQ 124 may attempt to schedule replayed loads that are waiting on the cache fill so that the replayed loads may forward the fill data as it is provided to DCache 104 (referred to as a fill forward operation). If the replayed load is not successfully replayed during the fill, the replayed load may subsequently be scheduled and replayed through DCache 104 as a cache hit. CIF 122 may also writeback modified cache lines that have been evicted by DCache 104, merge store data for non-cacheable stores, etc.

Execution units 112 may include any types of execution units in various embodiments. For example, execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may include hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 112 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. ICache 102, DCache 104, ITLB 103 and DTLB 125 may each be a cache having any desired capacity, cache line size, and configuration. There may be more additional levels of cache between the DCache 104/ICache 102/ITLB 103/DTLB 104 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

In the present context, ICache 102, DCache 104, ITLB 103 and DTLB 125 are regarded as types of cache. Each of ITLB 103 and DTLB 125 is sometimes referred to as simply "TLB" for brevity. Processor 30 further includes cache management logic 127 that is configured to carry out the cache management techniques described herein. The disclosed techniques may be applied to any of the caches described herein, e.g., to ICache 102, DCache 104, ITLB 103 and/or DTLB 125. In some embodiments, a cache may have multiple levels. For example, processor 30 may include a shared Level-2 TLB (L2TLB—not shown in the figure) that is shared between ITLB 103 and DTLB 125, or a Level-2 Icache (L2ICache or L2TLB—not shown in the figure). The cache management techniques described herein can be used with any such cache. The figure shows a single instance of cache management logic 127.

In some embodiments the disclosed techniques are applied to more than one cache memory in processor 30, e.g., to two or more of ICache 102, ITLB 103 and DTLB 104. In such embodiments, each of these caches may be coupled to a respective instance of cache management logic 127. In other embodiments, the same instance of cache management logic 127 is coupled to two or more of ICache 102, ITLB 103 and DTLB 104 for carrying out the disclosed techniques.

Example Cache-Memory Starvation Scenarios

Figure 3:
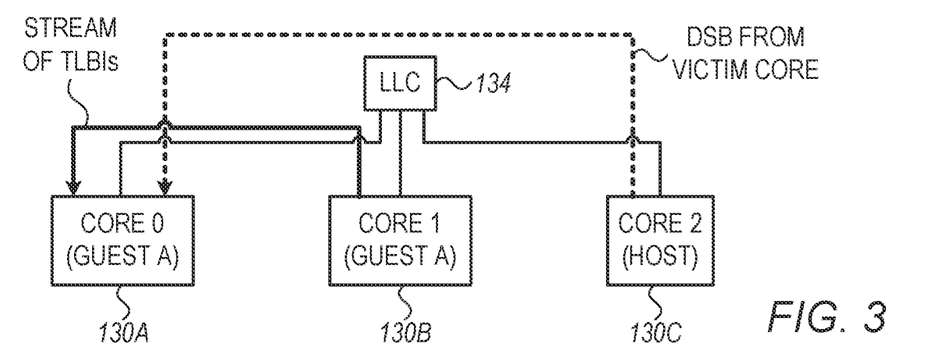
FIG. 3 is a diagram that schematically illustrates an example scenario of Translation Lookaside Buffer (TLB) starvation, in accordance with an embodiment that is described herein.

FIG. 3 is a diagram that schematically illustrates an example scenario of Translation Lookaside Buffer (TLB) starvation, in accordance with an embodiment that is described herein. FIG. 3 shows three processor cores 130A, 130B and 130C (denoted CORE0, CORE1 and CORE2, respectively) that share a common Last-Level Cache (LLC) 134 in accessing a memory.

In the present example, a certain guest application (denoted "GUEST A") runs on CORE0 and CORE1, and a host application (denoted HOST, e.g., an operating system) runs on CORE2. As part of its operation, the guest application on CORE1 generates a stream of TLB Invalidates (TLBIs)—One example of a stream of cache-invalidation commands. The stream of TLBIs reach, inter alia, CORE0 and CORE2. At a certain time during the stream of TLBIs, the host application on CORE2 issues a Data Synchronization Barrier (DSB). The DSB is typically broadcast to the various cores, and thus reaches CORE0 as well.

Unless mitigated using the disclosed techniques, the stream of TLBIs may prevent CORE0 from responding to CORE2's DSB, thus preventing CORE2 from completing the DSB. In such an event, CORE2 will typically stall entirely, either immediately or gradually. CORE2 is thus referred to as a "victim" core in this scenario.

In the present example CORE2 runs a host application or hypervisor, by way of example. In alternative embodiments, CORE2 may run an application (e.g., a different guest application denoted "GUEST B", the same GUEST A application that runs on CORE0 and CORE1, an operating system or a hypervisor) that is a victim of the stream of TLBIs.

Figure 4A:
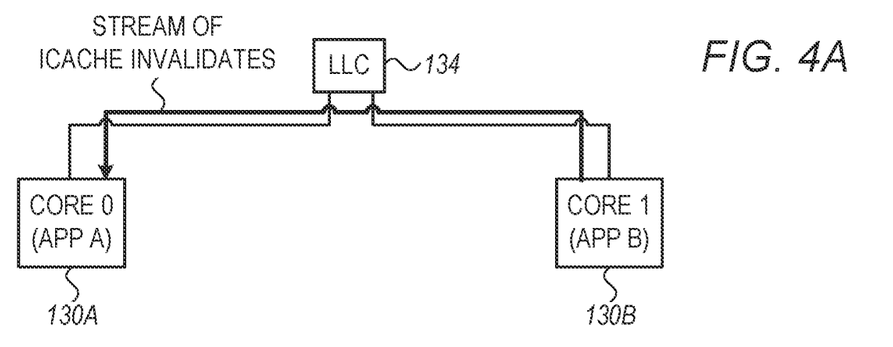
FIGS. 4A and 4B are diagrams that schematically illustrate example scenarios of Instruction Cache (ICache) starvation, in accordance with embodiments that is described herein.

FIG. 4A is a diagram that schematically illustrates an example scenario of Instruction Cache (ICache) starvation, in accordance with an embodiment that is described herein. In this example, an application denoted "APP A" runs on CORE0, and another app, denoted "APP B", runs on CORE1. APP B, running on CORE1, generates a stream of ICache invalidates—Another example of a stream of cache-invalidation commands. The stream of ICache invalidates reach, inter alia, CORE0. Depending on the specific processor design, such a scenario may cause CORE0 to stall entirely, or intermittently.

Figure 4B:
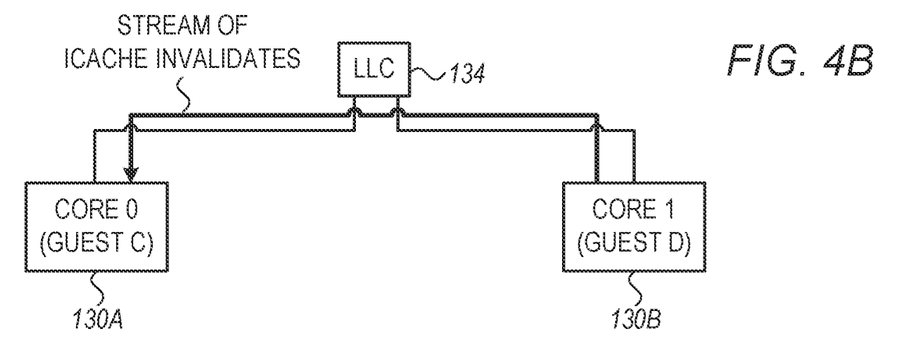

FIG. 4B is a diagram that schematically illustrates another example scenario of ICache starvation, in accordance with an alternative embodiment that is described herein. In the example of FIG. 4B, CORE0 runs a guest Virtual Machine (VM) denoted "GUEST C", and CORE1 runs a guest VM denoted "GUEST D". GUEST D generates a stream of ICache invalidates that causes performance degradation or starvation in GUEST C.

In the scenarios of FIGS. 4A and 4B, CORE0 is regarded the victim core. An underlying assumption is that the ICache invalidates affect (at least) a cache-line that CORE0 is attempting to fetch. The ICache invalidates may, for instance, specify the specific cache-line in question (e.g., in terms of a Virtual Address—VA). Alternatively, the ICache invalidates may specify "Invalidate All," i.e., request invalidation of all cache-lines in the other cores. Such a stream of ICache invalidates may prevent CORE0 from using the ICache, and possibly prevent CORE0 from bypassing the data around the ICache. In yet another case, CORE0 does not perform precise address matching vs. the ICache invalidates.

The scenarios depicted in FIGS. 3, 4A and 4B may occur, for example, in SOC 10 of FIG. 1. Referring to FIGS. 1 and 2, cores 130A-130C may include respective processors 30 of SOC 10. LLC 134 (also referred to as a system cache) may reside in memory controller 22. Alternatively, however, the scenarios of FIGS. 3, 4A and 4B may be applicable in other suitable system configurations. The description that follows explains how the disclosed techniques protect the system (e.g., SOC 10) from such scenarios, in accordance with embodiments. The disclosed techniques may be carried out, for example, by cache management logic 127 (FIG. 1) of the victim core.

Cache-Memory Starvation Mitigation Techniques

In some embodiments, at least one of processors 30 in SOC 10 includes cache management logic 127 that, among other tasks, protects the processor from the adverse effects of streams of cache-invalidation commands. In some embodiments, although not necessarily, all processors 30 of SOC 10 include respective cache management logic of this sort. The description below refers to cache-management 127 of an example processor 30 in system 10.

Figure 5:
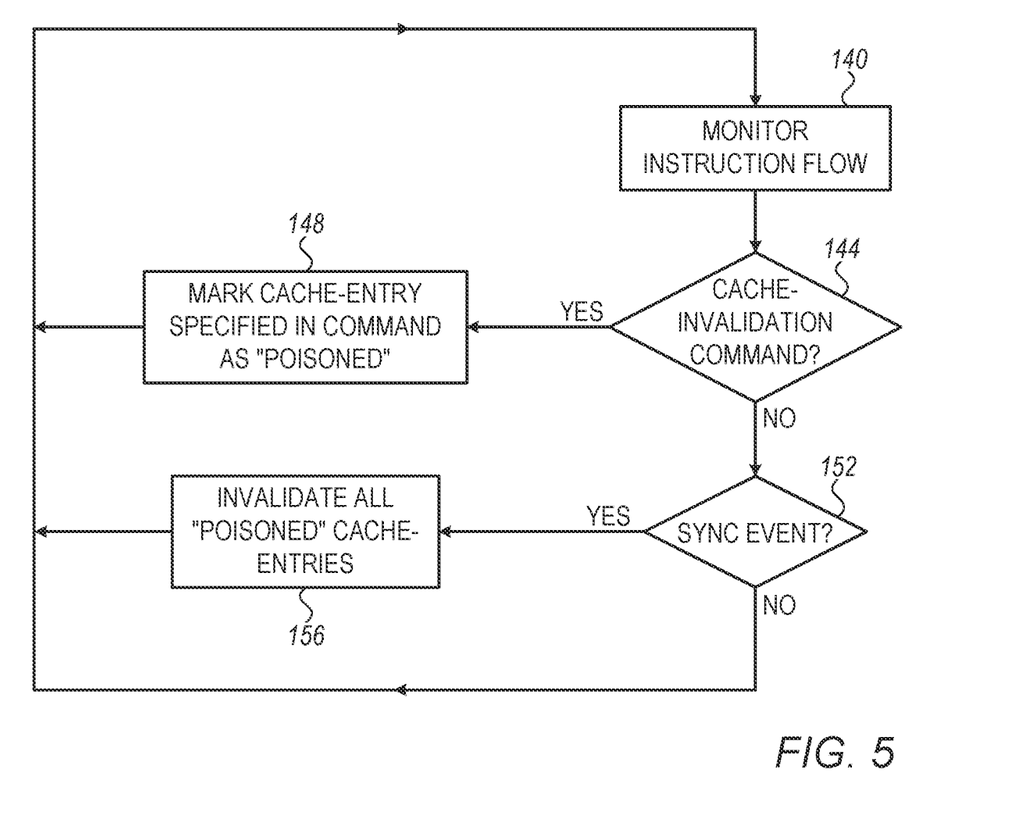
FIG. 5 is a flow chart that schematically illustrates a method for protecting a processor from cache-memory (e.g., TLB, ICache, or DCache) starvation, in accordance with an embodiment that is described herein.

FIG. 5 is a flow chart that schematically illustrates a method for protecting processor 30 from cache-memory starvation (e.g., starvation of ITLB 103, DTLB 125 or ICache 102—See FIG. 2), in accordance with an embodiment that is described herein. The method begins with cache management logic 127 monitoring the instruction flow in processor 30, at a monitoring stage 140.

At a cache-invalidation detection stage 144, cache management logic 127 checks whether a cache-invalidation command has been received in processor 30 from one of the other processors. When the cache memory being protected is a TLB (e.g., ITLB 103 or DTLB 125), stage 144 checks for a TLBI. When the cache memory being protected is an ICache (e.g., ICache 102), stage 144 checks for an ICache Invalidate.

If a cache-invalidation command has been received, cache management logic 127 does not invalidate the requested cache-entry (or entries), but rather marks them as "poisoned" (i.e., as intended for invalidation), at a marking stage 148. For example, if the cache-invalidation command specifies a particular address (Virtual address—VA, or Physical Address—PA), cache management logic 127 marks the cache-entry having this address as poisoned. As another example, if the cache-invalidation command specifies "Invalidate All", cache management logic 127 marks all cache-entries as poisoned. The method then loops back to stage 140 above.

At a sync event checking stage 152, cache management logic 127 checks whether a synchronization event is detected (e.g., whether a synchronization barrier command has arrived either from another processor and executed, or executed in the same processor). For example, when the cache memory being protected is a TLB (e.g., ITLB 103 or DTLB 125), stage 144 checks for a Data Synchronization Barrier (DSB). In the scenario of FIG. 3, for example, the DSB arrives from the victim core (CORE2) to CORE0. When the cache memory being protected is an ICache (e.g., ICache 102), stage 152 checks for an Instruction Synchronization Barrier (ISB), and in some embodiments for a successful fetching of an instruction from outside the ICache. In the scenario of FIGS. 4A and 4B, the ISB is executed locally on CORE0.

Thus, in the present context, the term "detecting a synchronization event" refers to both a synchronization event received from another core, and to a synchronization event generated locally in the same core.

If no synchronization event is detected, the method loops back to stage 140 above. Upon detecting a synchronization event at stage 152, cache management logic 127 invalidates all the poisoned cache-entries in the cache, at an invalidation stage 156. Upon invalidating a certain cache-entry, cache management logic 127 removes the mark that specified the cache-entry as poisoned. The method then loops back to stage 140 above.

The flow of FIG. 5 is as example flow that is depicted purely for the sake of conceptual clarity. In alternative embodiments, any other suitable flow can be used for carrying out the disclosed techniques. Moreover, it is noted that the disclosed techniques, e.g., the method of FIG. 5, are applicable in a wide variety of use-cases and scenarios, and are in no way limited to the example scenarios of FIGS. 3, 4A and 4B above.

Furthermore, the embodiments described herein refer mainly to cache-invalidation commands and synchronization events (e.g., synchronization barrier commands) of the ARM ISA. In alternative embodiments, the disclosed techniques can be used with any other suitable processor or ISA type.

In various embodiments, cache management logic 127 may use various techniques and/or data structures for marking selected cache-entries as poisoned. For example, cache management logic 127 may mark a certain cache-entry as poisoned by setting a respective indication bit associated with the specified cache-entry. Upon actual invalidation of a poisoned cache-entry, cache management logic 127 removes the mark by resetting this bit. The indication bits may reside, for example, in the respective cache-entries, or together in a dedicated bitmap.

Alternatively, to using a separate bit for marking each cache-entry, a group of cache-entries may share a marking bit. As yet another example, cache management logic 127 may mark selected cache-entries as poisoned by adding the indices (or other identifiers) of the cache-entries to a list. If such a list (which may support a small number of entries) overflows, logic 127 may replace old indices on the list with newly-added indices, and immediately invalidate cache-entries corresponding to indices that are removed from the list. Alternatively, if the list overflows, logic 127 may revert to a coarser-granularity tracking mechanism, such as poisoning a large group of, or all, cache-entries.

In an alternative embodiment, the cache in question may include separate memory regions that are dedicated for poisoned cache-entries and for non-poisoned cache-entries, respectively. In this embodiment, cache management logic 127 marks a certain cache-entry as poisoned by moving the cache-entry from the "non-poisoned" region of the cache to the "poisoned" region. Upon actual invalidation of a poisoned cache-entry, cache management logic 127 typically invalidates the cache-entry in-place. Since the cache-entry has been invalidated, the next attempt to access this cache-entry will cause a cache miss, and the new cache-entry fetched from memory will be placed by cache management logic 127 in the "non-poisoned" region.

This technique is efficient in terms of memory space, since it does not require additional bits for marking. Further alternatively, cache management logic 127 may use any other suitable scheme for marking cache-entries as poisoned and/or non-poisoned.

In some embodiments, the cache is accessed by Virtual Address (VA). This is typically the case with TLBs. In other embodiments, the cache is accessed by Physical Address (PA). ICaches, for example, may be accessed by VA (in some operational modes) or by PA (in other operational modes). Similarly, cache-invalidation commands may specify the cache-entries to be invalidated in terms of VA, or in terms of PA. In some embodiments, cache management logic 127 receives a cache-invalidation command that specifies a VA, for application to a cache that is accessed by PA. In these embodiments, cache management logic 127 translates the VA specified in the cache-invalidation command into the corresponding PA, and then proceeds to mark the cache-entry corresponding to the PA as poisoned.

Conditional Poisoning and Invalidation Depending on Scope

In some embodiments, a cache-invalidation command specifies a "scope" in addition to the cache-entry (or entries) to be invalidated. The scope may include, for example, a VM identifier (VM_ID) that identifies the VM that generated the cache-invalidation command, a process identifier (PROCESS_ID) that identifies the software process or thread that generated the cache-invalidation command, or a combination of VM_ID and PROCESS_ID. Additionally or alternatively, the scope may specify, for example, whether or not the core generating the cache-invalidation command is executing in a VM, or whether this core is executing as the HOST. Typically, if the core is executing as the HOST, then VM_ID is not applicable. Some or all of the cache-entries in the cache may also have a specified scope. The "scoping" mechanism enables invalidation to be applied more selectively, with a finer granularity.

In some embodiments, upon receiving a cache-invalidation command and finding a cache-entry that matches it, cache management logic 127 decides whether to mark the cache-entry as poisoned, depending on whether the scope of the cache-entry matches the scope of the cache-invalidation command. In other embodiments, cache management logic 127 may decide to mark a cache-entry as poisoned even though its scope differs from the scope of the cache-invalidation command.

In an example embodiment, cache management logic 127 compares the scope of the cache-entry to the scope of the cache-invalidation command. If the two scopes match, cache management logic 127 invalidates the cache-entry immediately. If the scopes do not match, cache management logic 127 marks the cache-entry as poisoned, and defers the actual invalidation of the cache-entry until a suitable synchronization event. When conditioning the poisoning and invalidation on scope, the synchronization event may include a context switch event in the processor. In such a case, in an embodiment, cache management logic 127 triggers invalidation on both a synchronization barrier and a context switch, whichever is first to occur. A context switch may comprise, for example, a change of Exception Level (EL), a switch from VM mode to non-VM mode, switch from one VM_ID to another or from one PROCESS_ID to another, and the like.

In one embodiment, cache management logic 127 does not trigger actual invalidation on any context-switch, but only on switching to a context in which it deferred cache-invalidation commands. For example, if logic 127 deferred cache-invalidation commands that targeted PROCESS_ID=C, then switching from PROCESS_ID=A to PROCESS_ID=B will not require actual invalidation yet. In other embodiments, logic 127 performs actual invalidation of poisoned cache-entries on any context-switch event.

In various embodiments, the scope may be determined in various ways. In some embodiments, the hypervisor controls whether cache-invalidation commands from one VM_ID can be deferred by other VM_IDs. The operating system controls whether cache-invalidation commands from one PROCESS_ID can be deferred by other PROCESS_IDs. Typically, higher privilege levels control the ICache invalidation scope of processes running beneath them. For example, the invalidation scope of an app is typically controlled by the operating system and/or the hypervisor, whereas the invalidation scope of an operating system is typically controlled by the hypervisor. In some embodiments, the invalidation scope is determined by (i) a set of control registers and (ii) as the current execution state.

Additionally or alternatively to VM_ID and/or PROCESS_ID, in some embodiments, the scope may include match fields such as SUBPROCESS_ID or a specific-purpose SCOPE_ID register value.

In some embodiments, cache management logic 127 may check for a matching scope (check whether the scope of a cache-entry matches the scope of a cache-invalidation command) using various functions. For example, the cache-invalidation command may specify a range or list of VM_IDs, PROCESS_IDs and/or other identifiers, which all need to fall within scope.

Further, additionally or alternatively, cache management logic 127 may use additional information to control the scope. For example, in an embodiment cache management logic 127 may restrict the invalidation scope only if the sender does not have write permission to the physical address (PA) being invalidated. If the sender has write permission, cache management logic 127 may set scope=ALL.

Additional Embodiments and Variations

Figure 6:
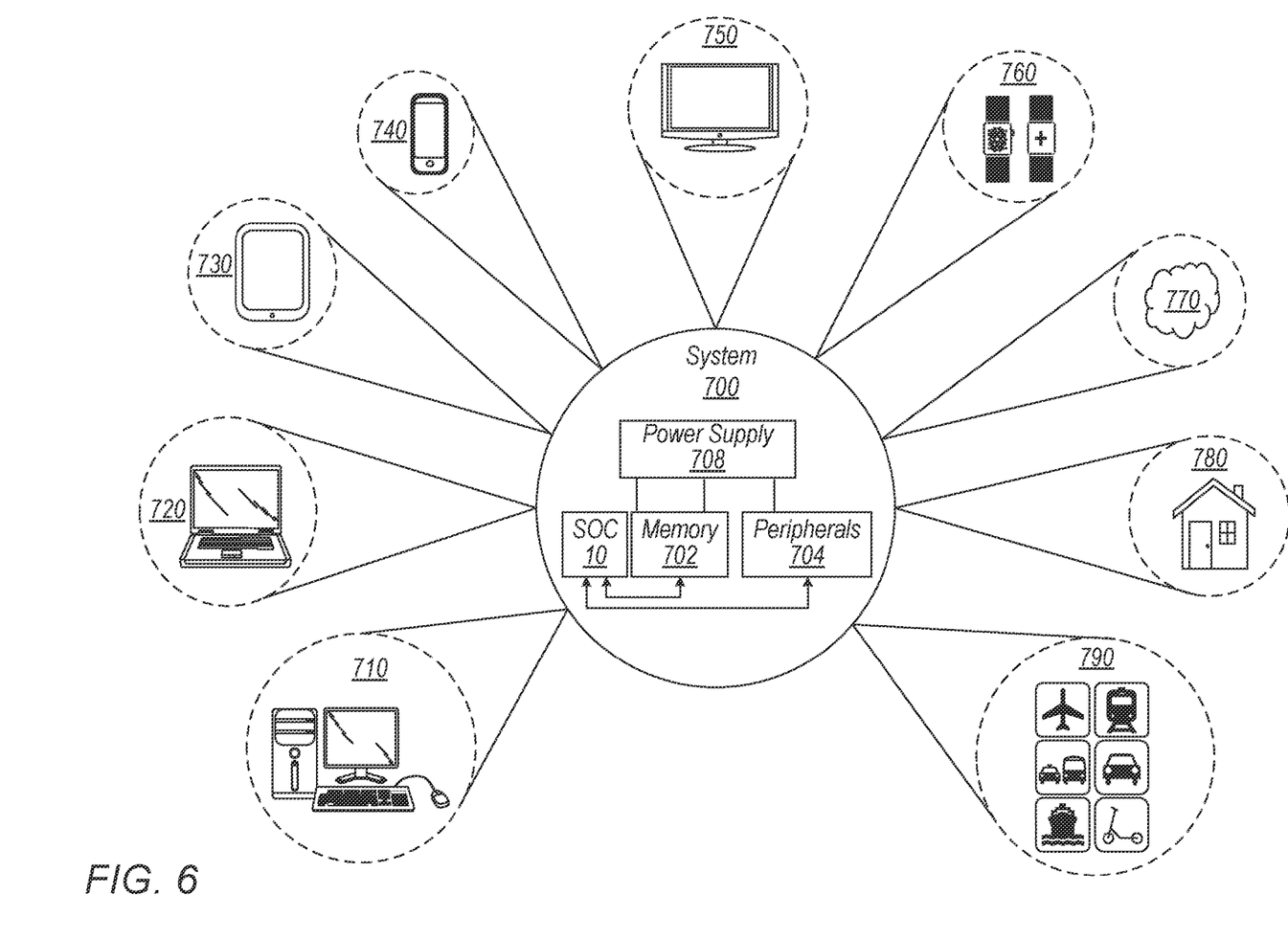
FIG. 6 is a block diagram that schematically illustrates a system, in accordance with an embodiment that is described herein.

FIG. 6 is a block diagram that schematically illustrates a system 700, in accordance with an embodiment that is described herein. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIG. 2, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

Figure 7:
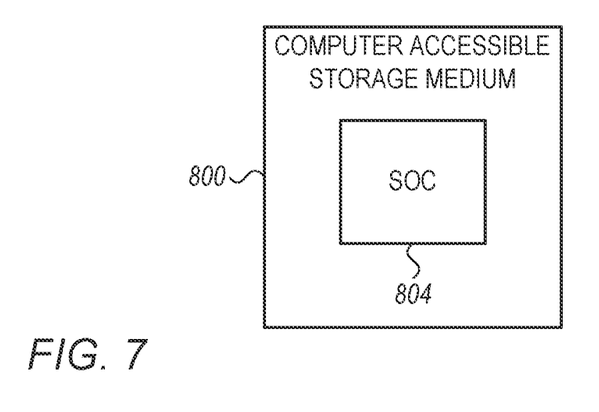
FIG. 7 is a block diagram that schematically illustrates a computer-readable storage medium, in accordance with an embodiment that is described herein.

FIG. 7 is a block diagram that schematically illustrates a computer-readable storage medium 800, in accordance with an embodiment that is described herein. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 7 may store a database 804 representative of the SOC 10. Generally, the database 804 may be a database which can be read by a program and used, directly or indirectly, to fabricate the hardware including the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates which also represent the functionality of the hardware including the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 2. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
multiple processors comprising respective cache memories, the cache memories configured to cache cache-entries for use by the processors,
wherein at least a processor among the processors comprises cache management logic that is configured to:
receive, from one or more of the other processors, cache-invalidation commands that request invalidation of specified cache-entries in the cache memory of the processor;
mark the specified cache-entries as intended for invalidation but defer actual invalidation of the specified cache-entries; and
upon detecting a synchronization event associated with the cache-invalidation commands, invalidate the cache-entries that were marked as intended for invalidation,
wherein at least some of the cache-invalidation commands have respective specified scopes, and wherein the cache management logic is configured to defer the actual invalidation in response to a cache-invalidation command only upon verifying that the scope of the cache-invalidation command matches a scope derived from a current execution state of the processor.

2. The apparatus according to claim 1, wherein the cache memory comprises a Translation Lookaside Buffer (TLB) configured to cache logical-to-physical address translation entries for the one or more processors.

3. The apparatus according to claim 2, wherein the synchronization event comprises a Data Synchronization Barrier (DSB) command.

4. The apparatus according to claim 1, wherein the cache memory comprises an Instruction Cache (ICache) configured to cache program instructions for the one or more processors.

5. The apparatus according to claim 4, wherein the synchronization event comprises an Instruction Synchronization Barrier (ISB) command.

6. The apparatus according to claim 4, wherein the synchronization event comprises a successful fetch of an instruction from outside the ICache.

7. The apparatus according to claim 1, wherein the cache management logic is configured to identify a read request, which matches a given cache-entry that is marked as intended for invalidation but has not been actually invalidated, and return the given cache-entry in response to the read request.

8. The apparatus according to claim 1, wherein to mark the specified cache-entries, the cache management logic is configured to set respective indications associated with the specified cache-entries.

9. The apparatus according to claim 1, wherein to mark the specified cache-entries, the cache management logic is configured to move the specified cache-entries to a region of the cache memory dedicated for cache-entries intended for invalidation.

10. The apparatus according to claim 1, wherein, by deferring the actual invalidation until the synchronization event, the cache management logic is configured to prevent stalling of any of the one or more processors due to a stream of the cache-invalidation commands.

11. The apparatus according to claim 1, wherein at least some of the cache-entries and at least some of the cache-invalidation commands have respective specified scopes, and wherein the cache management logic is configured to defer the actual invalidation of a cache-entry in response to a cache-invalidation command irrespective of whether the scope of the cache entry matches the scope of the cache-invalidation command.

12. The apparatus according to claim 1, wherein the synchronization event comprises a context switch.

13. The apparatus according to claim 1, wherein:
the synchronization event comprises a synchronization barrier instruction associated with the cache-invalidation commands; and
invalidation of the cache-entries, which were marked as intended for invalidation, is performed directly in response to detecting the synchronization barrier instruction in an instruction flow of the processor.

14. A method, comprising:
caching cache-entries in respective cache memories, for use by multiple processors; and
in at least a processor among the processors:
receiving, from one or more of the other processors, cache-invalidation commands that request invalidation of specified cache-entries in the cache memory of the processor;
marking the specified cache-entries as intended for invalidation but deferring actual invalidation of the specified cache-entries; and
upon detecting a synchronization event associated with the cache-invalidation commands, invalidating the cache-entries that were marked as intended for invalidation, wherein at least some of the cache-invalidation commands have respective specified scopes, and wherein deferring the actual invalidation in response to a cache-invalidation command is performed only upon verifying that the scope of the cache-invalidation command matches a scope derived from a current execution state of the processor.

15. The method according to claim 14, wherein the cache memory comprises a Translation Lookaside Buffer (TLB) configured to cache logical-to-physical address translation entries for the one or more processors, and wherein the synchronization event comprises a Data Synchronization Barrier (DSB) command.

16. The method according to claim 14, wherein the cache memory comprises an Instruction Cache (ICache) configured to cache program instructions for the one or more processors, and wherein the synchronization event comprises an Instruction Synchronization Barrier (ISB) command or a successful fetch of an instruction from outside the ICache.

17. The method according to claim 14, wherein marking the specified cache-entries comprises setting respective indications associated with the specified cache-entries.

18. The method according to claim 14, wherein marking the specified cache-entries comprises moving the specified cache-entries to a region of the cache memory dedicated for cache-entries intended for invalidation.

19. The method according to claim 14, wherein the synchronization event comprises a context switch.

20. The method according to claim 14, wherein:

the synchronization event comprises a synchronization barrier instruction associated with the cache-invalidation commands; and invalidation of the cache-entries, which were marked as intended for invalidation, is performed directly in response to detecting the synchronization barrier instruction in an instruction flow of the processor.

* * * * *